United States Patent [19]

Terada

[11] Patent Number: 4,675,801
[45] Date of Patent: Jun. 23, 1987

[54] POWER TRANSFER CIRCUIT
[75] Inventor: Hiroshi Terada, Yaita, Japan
[73] Assignee: Sharp Kabushiki Kaisha, Osaka, Japan
[21] Appl. No.: 735,757
[22] Filed: May 20, 1985
[30] Foreign Application Priority Data Jun. 14, 1984 [JP] Japan ................................. 59-88396
Sep. 17, 1984 [JP] Japan ............................... 59-141405

[51] Int. Cl.$^4$ ........................................... H02M 7/04
[52] U.S. Cl. .................................... 363/143; 323/272
[58] Field of Search ..................... 363/88, 100, 143; 323/271, 272, 299; 307/65, 75, 80

[56] References Cited
U.S. PATENT DOCUMENTS 3,205,426 9/1965 Mills ................................. 363/88 X
4,001,668 1/1977 Lewis ................................. 323/299

OTHER PUBLICATIONS

Winchester, Charles R., "Power-Supply Voltage Changed 2:1 with SPDT Switch Arrangement", Electronic Design, Feb. 16, 1976, p. 174.
Brown, D. J., "Un Cambia-Tensione Insolito per Alimentatori", Electron. Oggi (Italy), Oct. 1981, p. 328.

Primary Examiner—Peter S. Wong
Assistant Examiner—Marc S. Hoff
Attorney, Agent, or Firm—Birch, Stewart, Kolasch & Birch

[57] ABSTRACT

A power transfer circuit includes a power transformer (2) having a center tap (12) provided in its secondary winding, a full-wave rectifier circuit (13), a level discriminator circuit (15) and a switching circuit (14). In response to a level discrimination made by the level discriminator circuit that a DC voltage outputted from one output terminal of the full-wave rectifier circuit is less than a predetermined voltage level, a transistor (Q1) and a thyristor (SCR) of the switching circuit are made conductive so as to ground the other output terminal of the full-wave rectifier circuit. In response to a level discrimination made by the level discriminator circuit that the DC voltage outputted from the said one output terminal of the full-wave rectifier circuit exceeds the predetermined voltage level, a diode (D9) connected to the center tap of the power transformer is made conductive to ground the center tap. Thus, the full-wave rectifier circuit outputs a constant DC voltage even if AC voltages at different levels are inputted in the primary winding of the power transformer.

5 Claims, 10 Drawing Figures

POWER TRANSFER CIRCUIT

BACKGROUND OF THE INVENTION

1. Field of the Invention

The present invention relates to a power transfer circuit. More specifically, it relates to a power transfer circuit which is applied to a television receiver or a radio receiver employing a power circuit receiving DC voltages from AC power sources through a rectifier circuit, to perform switching operation for stabilizing the derived DC voltage when the AC power sources are different in voltage level from each other.

2. Description of the Prior Art

In general, AC power sources, employed in various countries may vary in voltage levels utilized. Specifically there are areas employing AC power sources of both 110 V and 220 V, of only 110 V and of only 220 V. When television receivers and the like are used in such areas employing AC power sources of different voltage levels, it is required to obtain predetermined constant DC voltages from such different supply voltages. Therefore, television receivers and the like generally contain power transfer circuits.

FIG. 1 is an electric circuit diagram showing a conventional power transfer circuit. In FIG. 1, an AC power source 1 is connected to both ends of a tap-down type power transformer 2, one end of which is connected with one switching terminal 6 of a changeover switch 4 while a center tap thereof is connected to the other switching terminal 7. A bridge rectifier circuit 8 formed by rectifying diodes D1, D2, D3 and D4 is connected between a fixed terminal 5 of the changeover switch 4 and the other end of the power transformer 2. The junction between the rectifying diodes D1 and D2 is grounded while a load 9 and a smoothing capacitor C1 are connected between the junction of the rectifying diodes D3 and D4 and ground.

The conventional power transfer circuit, having a structure as hereinabove described, when the circuit is applied to an AC power source of 110 V, the said one switching terminal 6 is connected to the fixed terminal 5 of the changeover switch 4 so that an AC voltage of 110 V is rectified by the bridge rectifier circuit 8 to derive a DC voltage $E_0$ of 110 V. When, on the other hand, the circuit is applied to an AC power source of 220 V, the changeover switch 4 is so switched as to connect the other switching terminal 7 to the fixed terminal 5, whereby an AC voltage of 220 V is stepped down to 110 V by the power transformer 2 since the other switching terminal 7 is connected to the center tap of the power transformer 2. The stepped-down voltage of 110 V is rectified by the bridge rectifier circuit 8, whereby a DC voltage E of 110 V is derived.

The changeover switch 4 is thus switched in the aforementioned manner, whereby a constant DC voltage is outputted from the bridge rectifier circuit 8 whether the voltage at the AC power source is 110 V or 220 V.

In the conventional power transfer circuit as shown in FIG. 1, the AC voltage is stepped down by the power transformer 2 to be supplied to the bridge rectifier circuit 8, whereby the demand from the power transformer 2 is increased. Further, in order to separate the internal chassis in a television receiver, a separate transformer must be newly provided at the input side of the power transformer 2, leading to an increase in the number of elements.

SUMMARY OF THE INVENTION

Accordingly, the principal object of the present invention is to provide a power transfer circuit which can reduce the demand from a power transformer and readily enable separation of a chassis in the interior of an electric device.

Briefly stated, according to the present invention a power transfer circuit is provided which comprises a power transformer, a full-wave rectifier circuit formed by a bridge circuit connected to both ends of a secondary winding of the power transformer and switching control means connected between a center tap of the secondary winding of the power transformer and system ground and between one output terminal of the full-wave rectifier circuit and ground, so as to selectively ground the center tap and the said one output terminal of the full-wave rectifier circuit in response to an AC supply voltage inputted to the power transformer.

Therefore, the power transfer circuit according to the present invention outputs a DC voltage of half the AC voltage inputted to the power transformer when the center tap of the secondary winding of the power transformer is grounded, while outputting a DC voltage at an equal amplitude to the inputted AC voltage when one output terminal of the full-wave rectifier circuit is grounded. Thus, the full-wave rectifier circuit can output a constant DC voltage regardless of the level of the AC voltage inputted in the power transformer.

In a preferred embodiment of the present invention, level discrimination is made by level discriminator means as to whether or not a DC voltage outputted from one output terminal of a full-wave rectifier circuit exceeds a predetermined level, and when the DC voltage outputted from the said one output terminal of the full-wave rectifier circuit is less than the predetermined level, switching elements connected between the said one output terminal of the full-wave rectifier circuit and ground are made conductive thereby to ground the other output terminal of the full-wave rectifier circuit. On the other hand, when a level discrimination is made that the DC voltage outputted from the said one output terminal of the full-wave rectifier circuit exceeds the predetermined voltage level, switching elements connected between a center tap of the secondary winding of the power transformer and the ground are made conductive thereby to ground the center tap.

Thus, according to the preferred embodiment of the present invention, the other output terminal of the full-wave rectifier circuit or the center tap can be automatically grounded in response to the level of the DC voltage outputted from the said one output terminal of the full-wave rectifier circuit, whereby no manual operation is required.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
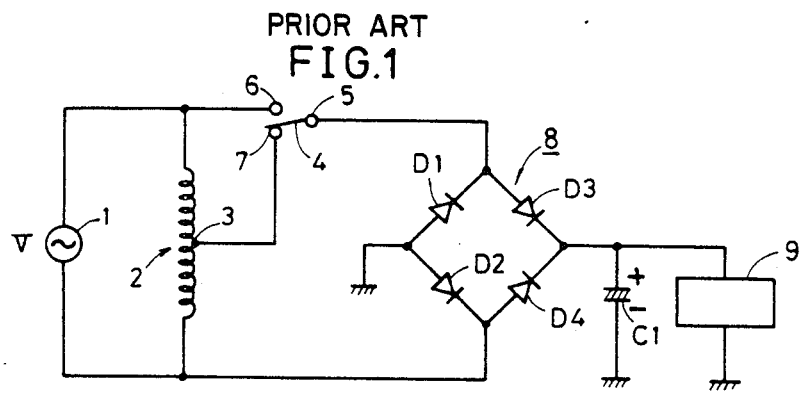
FIG. 1 is an electric circuit diagram showing a conventional power transfer circuit.
Figure 2:
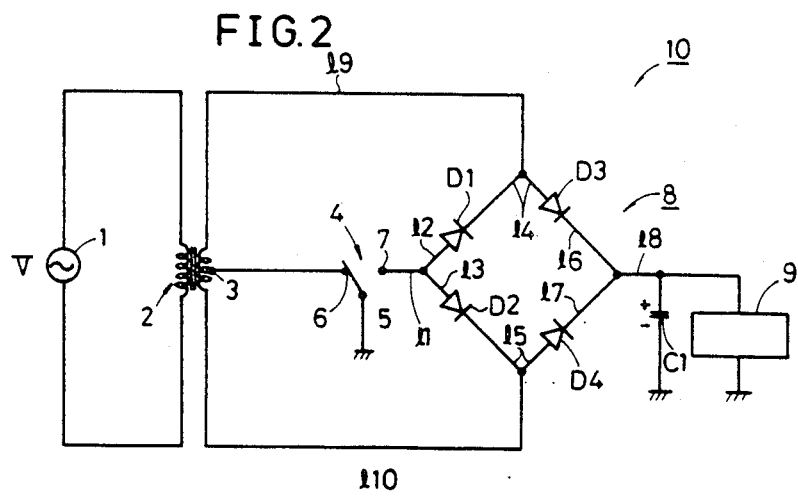
FIG. 2 is an electric circuit diagram showing an embodiment of the present invention.

FIG. 2 is an electric circuit diagram showing an embodiment of the present invention. A power circuit 10 includes a power transformer 2 having a center tap 3 provided at the intermediate portion of a secondary winding thereof, a full-wave rectifier circuit 8 in the form of a bridge circuit formed by rectifying diodes D1 to D4 and switching means 4 for grounding the center tap 3 or one output terminal of the full-wave rectifier circuit 8. A common terminal 5 of the switching means 4 is grounded at a common potential, while one terminal 6 thereof is connected to the center tap 3 of the power transformer 2 and the other terminal 7 is connected to the said one output terminal of the full-wave rectifier circuit 8 through a line 11.

The line 11 is connected to the anodes of the rectifying diodes D1 and D2 respectively through branch lines 12 and 13. The cathode of the rectifying diode D1 is connected to the anode of the rectifying diode D3 through a line 14. The cathode of the rectifying diode D2 is connected to the anode of the diode D4 through a line 15. The cathodes of the rectifying diodes D3 and D4 are connected to a line 18 through lines 16 and 17 respectively. One terminal of the secondary winding of the power transformer 2 is connected to the aforementioned line 14 through a line 19 while the other terminal of the secondary winding is connected to the aforementioned line 15 through a line 110.

The power circuit 10 in the above described structure is connected through the line 18 to one terminal of a load 9, the other terminal of which is grounded at the common potential. The line 18 is connected to an electrolytic capacitor C1, which is grounded at the common potential.

Figure 4:
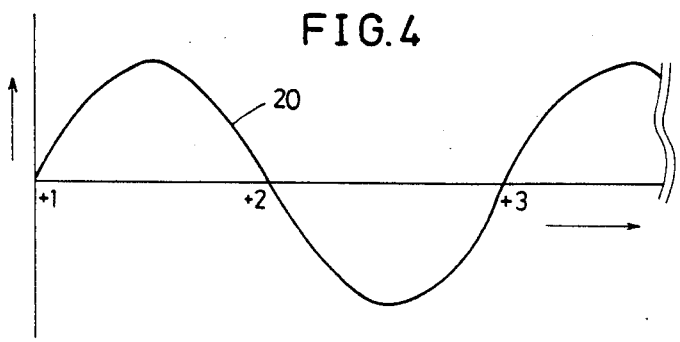
FIG. 4 is a waveform diagram of the voltage inputted in a power transformer as shown in FIG. 2.
Figure 3A:
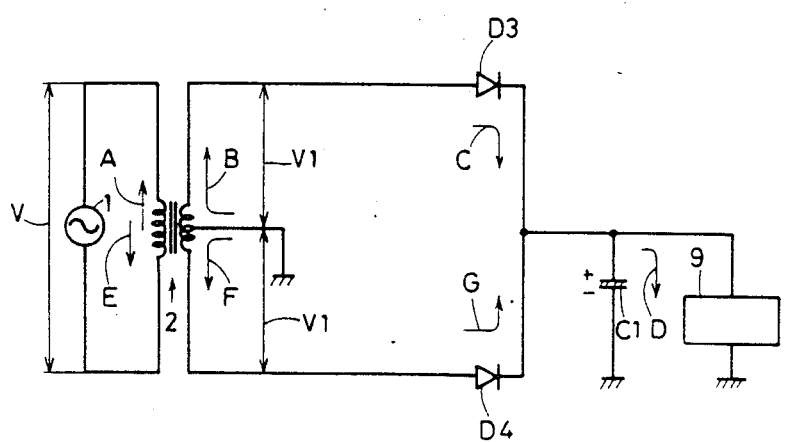
FIGS. 3A and 3B are diagrams for illustrating operational states of a rectifier circuit as shown in FIG. 2.
Figure 3B:
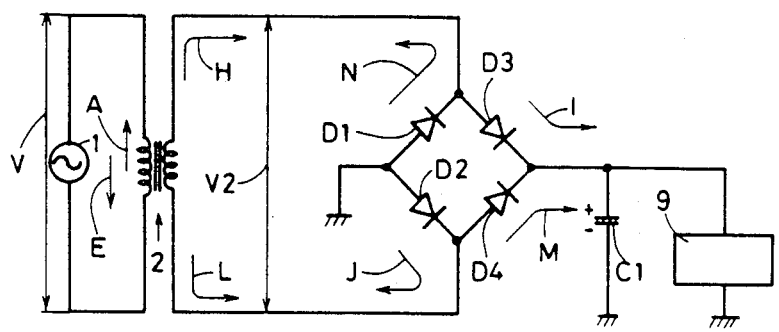

FIGS. 3A and 3B are diagrams for illustrating operation of the circuit as shown in FIG. 2, and FIG. 4 is a waveform diagram of the voltage inputted in the power transformer 2.

Description is now made of the operation of the embodiment of the present invention with reference to FIGS. 2 to 4. The circuit as shown in FIG. 2 may be regarded equivalent to that shown in FIG. 3A when the common terminal 5 of the switching means 4 is connected to its one terminal 6, since no current flows to the diodes D1 and D2 in this case. An AC voltage V having the waveform as shown in FIG. 4 is supplied to the primary winding side of the power transformer 2. During the time $t_1$ to $t_2$, the current flows in the primary winding side in an arrow A direction while the current flows in the secondary winding side in directions along arrows B, C and D. During the time $t_2$ to $t_3$ as shown in FIG. 4, the current flows in the primary winding side in an arrow E direction. At this time, the current flows in the secondary winding side in directions along arrows F, G and D.

Thus, a full-wave rectifier circuit can be implemented in the case where the common terminal 5 of the changeover switch 4 in FIG. 2 is connected to its one terminal 6. It is assumed here that the ratio in number of the primary winding to the secondary winding of the power transformer 2 is n:2. The intermediate portion of the secondary winding is grounded at the common potential through the center tap 3, and hence the voltage V1 obtained on the secondary side of the power transformer is expressed as follows:

$$V1 = V/2 \tag{1}$$

When, on the other hand, the common terminal 5 of the switching means 4 as shown in FIG. 2 is connected to the other terminal 7, the power circuit 10 is equivalent to the circuit as shown in FIG. 3B since no current flows to the center tap 3. At this time, a voltage V having such a waveform as shown in FIG. 4 is applied to the primary side of the power transformer 2. Then, during the time $t_1$ to $t_2$ in FIG. 4, the current flows in an arrow A direction in FIG. 3B. In the secondary winding side, the current flows in the directions along arrows H, I and J.

During the time $t_2$ to $t_3$ in FIG. 4, the current flows in the primary winding side of the power transformer 2 in an arrow E direction while the current flows in directions along arrows L, M and N in the secondary winding side.

The voltage V2 appearing at the secondary winding side at this time is expressed as follows:

$$V2 = 2 \cdot V/n \tag{2}$$

Comparing the voltages V1 and V2 obtained in the secondary winding side respectively in FIGS. 3A and 3B, the relation between the voltages V1 and V2 is expressed as follows:

$$V2 = 2 \cdot V1 \tag{3}$$

Therefore, the circuit as shown in FIG. 2 can be employed as a double-voltage power transfer circuit by switching the switching means 4.

However, one might inadvertently use such a power circuit 10 as shown in FIG. 2 under an unsuitable voltage level, forgetting to switch the switching means 4. Description is now made on another embodiment in which the switching means 4 can be automatically switched.

Figure 5:
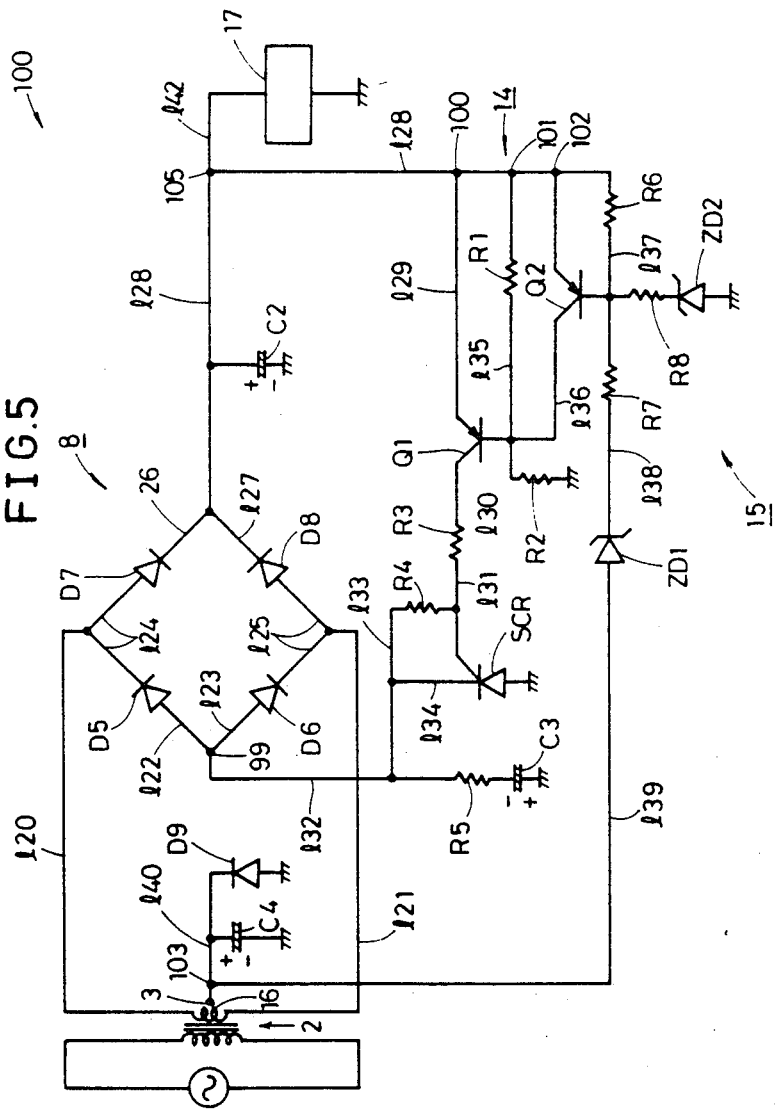
FIG. 5 is an electric circuit diagram showing another embodiment of the present invention.

FIG. 5 is an electric circuit diagram showing another embodiment of the present invention. Referring now to FIG. 5, description is made of the structure of this embodiment of the present invention. A power circuit 100 includes a power transformer 2, a diode D9 connected between a center tap 3 of the power transformer 2 and ground, a full-wave rectifier circuit 8 in the form of a bridge circuit, transistors Q1 and Q2 forming a switching circuit 14, a thyristor SCR and Zener diodes ZD1 and ZD2 forming a level discriminator circuit 15. The ratio of primary windings to secondary windings of the power transformer 2 is selected to be n:2.

One end of secondary winding 16 of the power transformer 2 is connected to one input end of the full-wave rectifier circuit 8 through a line 120. The other end of the secondary winding 16 is connected to the other input end of the full-wave rectifier circuit 8 through a line 121.

Lines 122 and 123 of the full-wave rectifier circuit 8 are connected to the anodes of diodes D5 and D6, while the cathode of the diode D5 is connected to the anode of a diode D7 through a line 124. The cathode of the diode D6 is connected to the anode of a diode D8 through a line 125. Respective cathodes of the diodes D7 and D8 are connected to a line 128 respectively through lines 126 and 127.

The line 128 is connected to one terminal of an electrolytic capacitor C2, the other terminals of which is grounded at a common potential. A junction 100 of the line 128 is connected to the emitter of the transistor Q1 through a line 129. The collector of the transistor Q1 is connected to one end of a resistor R3 through a line 130. The other end of the resistor R3 is connected to the gate of the thyristor SCR through a line 131.

The aforementioned lines 122 and 123 of the full-wave rectifier circuit 8 are connected to an end of a resistor R5 through a line 132. The other end of the resistor R5 is connected to one end of an electrolytic capacitor C3, the other end of which is grounded at the common potential. The aforementioned line 131 is connected to one end of a resistor R4, whose other end is connected to a line 132 through a line 133.

The anode of the aforementioned thyristor SCR is grounded at the common potential, while the cathode thereof is connected to the aforementioned line 133 through a line 134. The junction 101 of the aforementioned line 128 is connected to one end of a resistor R1, the other end of which is connected to one end of the resistor R2 through a line 135. The other end of the resistor R2 is grounded at the common potential. The line 135 is connected with the base of the transistor Q1.

A junction 102 of the line 128 is connected to the emitter of the transistor Q2, the collector of which is connected with the line 135 through a line 136. The aforementioned line 128 is connected to one end of a resistor R6, the other end of which is connected to one end of a resistor R7 through a line 137. The other end of the resistor R7 is connected to the cathode of the Zener diode ZD1 through a line 138. The aforementioned line 137 is connected to the base of the transistor Q2 as well as to one end of a resistor R8, the other end of which is connected to the cathode of the Zener diode ZD2. The anode of the Zener diode ZD2 is grounded at the common potential.

The anode of the Zener diode ZD1 is connected through a line 139 to the junction 103 of a line 140 which connects the center tap 3 and the diode D9. An end portion of the line 140 is the center tap 3 of the secondary winding 16 of the power transformer 2, and the other end of the line 140 is connected to the cathode of the diode D9, whose anode is grounded at the common potential. An intermediate portion between the junction 103 of the line 140 and the diode D9 is connected to one end of an electrolytic capacitor C4, whose other end is grounded at the common potential. The junction 105 of the line 28 is connected through a line 142 to one end of a load 17 whose other end is grounded at the common potential, so that a voltage $E_0$ is applied to the load 17.

Figure 6A:
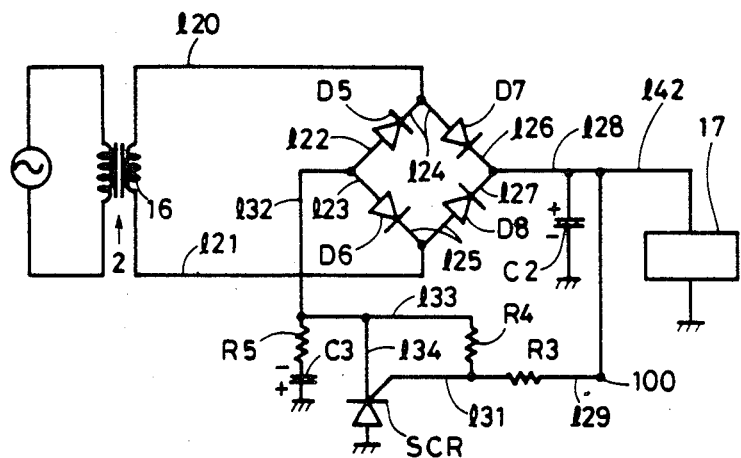
FIGS. 6A and 6B are diagrams for illustrating operation of the circuit as shown in FIG. 5.
Figure 6B:
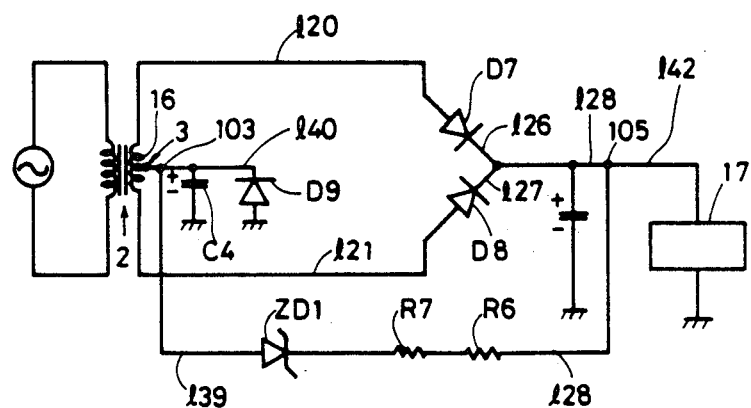
Figure 7:
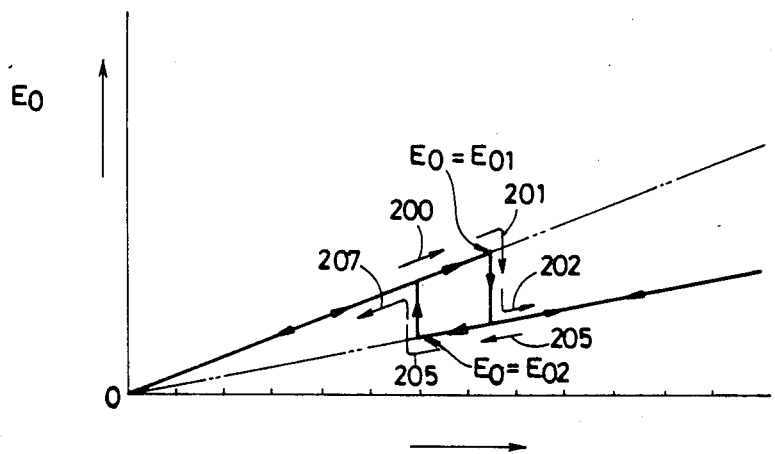
FIGS. 7 and 8 are diagrams for illustrating changes in voltages at a load 17 and a junction 103 as shown in FIG. 5.
Figure 8:
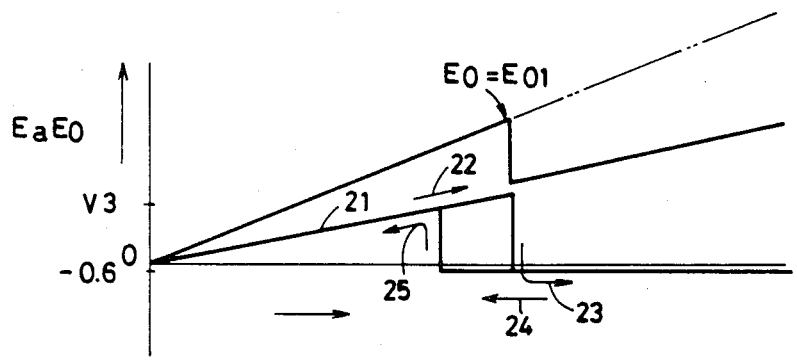

FIGS. 6A and 6B are diagrams for illustrating operation of the circuit as shown in FIG. 5, and FIGS. 7 and 8 are diagrams for illustrating changes in voltages at the load 17 and the junction 103 as shown in FIG. 5.

Referring to FIGS. 5 to 8, operation of this second embodiment is now described. In the switching circuit 14 of the power circuit 100 in the aforementioned structure, resistance values of the resistors R1 and R2 are so selected that the transistor Q1 enters an ON state when the transistor Q2 is in an OFF state. When the transistor Q1 enters an ON state, the current flows to the gate side of the thyristor SCR through the line 129, the transistor Q1 and the resistor R3, whereby the thyristor SCR is made conductive. Therefore, the junction 99 of the full-wave rectifier circuit 8 is grounded at the common potential through the thyristor SCR. The current flows to both ends of the secondary winding 16 of the power transformer 2 at this time, whereby the voltage at the center tap 3 reaches a level $E_1/2$ with respect to the voltage $E_1$ at the secondary winding 16. Therefore, the line 140 is at a positive potential, thereby to prevent the current from flowing to the diode D9, the line 140 and the center tap 3. Consequently, the power circuit 100 as shown in FIG. 5 is basically equivalent to the circuit as shown in FIG. 6A.

When the transistor Q2 enters an ON state, the voltages at the line 128 and the base of the transistor Q1 reach the same level, whereby the transistor Q1 enters an OFF state. As a result, the current flowing to the gate of the thyristor SCR and the voltage between the anode and the cathode of the thyristor SCR are both eliminated, whereby the thyristor SCR enters an OFF state. As a result, no current flows to the junction 99 of the full-wave rectifier circuit 8. At this time, the junction 103 of the line 140 is at a minus potential as hereinafter described, whereby the current flows to the line 140 through the diode D9. Therefore, the power circuit 100 is basically equivalent to the circuit as shown in FIG. 6B. At this time, the relation between the voltage $E_2$ appearing at the secondary side of the power transformer 2 and the voltage E1 in FIG. 6A is:

$$E_1 = 2 \cdot E_2 \qquad (4)$$

Therefore, this circuit 100 implements a power circuit which can be applied to both single and double voltages.

Operation for switching between the single and double voltages is hereafter described in further detail with reference to FIGS. 5 to 8 and Tables 1 and 2.

TABLE 1

| | VOLTAGE LOW → $E_{02}$ → $E_{01}$ → HIGH | | |
|---|---|---|---|
| ZD1 | OFF | ON | ON |
| ZD2 | OFF | OFF | ON |
| Q1 | ON | ON | OFF |
| Q2 | OFF | OFF | ON |
| SCR | ON | ON | OFF |

The AC voltage V1 in the primary winding side of the power transformer 2 is gradually increased, e.g., from around 80 V. At this time, during the time when the level of the voltage $E_0$ applied to the load 17 is less than $E_{01}$ as shown in Table 1, the transistor Q1 is in an OFF state while the transistor Q1 and the thyristor SCR are in ON states. Therefore, the power circuit 100 as shown in FIG. 5 is equivalent to the circuit as shown in FIG. 6A.

When the voltage $E_0$ at the load 17 reaches the level $E_{01}$ as shown in Table 1, the Zener diode ZD2 is made conductive so that the current flows to the same thereby to turn the transistor Q2 on. Therefore, the base of the transistor Q1 and the line 28 are short-circuited through the transistor Q2. As a result, the potentials at the emitter and the base of the transistor Q1 sufficiently approximate each other so that the transistor Q1 turns off. Further, potentials at the cathode and the anode of the thyristor SCR are made equal to each other, whereby the thyristor SCR enters an OFF state. As a result the circuit in which the junction 99 of the bridge circuit 8 is grounded at the common potential through the thyristor SCR is open.

At this time, the power circuit 100 as shown in FIG. 5 is equivalent to the circuit as shown in FIG. 6B. With respect to FIG. 6B, the voltage $E_2$ appearing at the secondary winding 16 side of the power transformer 2 is as follows, when compared with the voltage $E_1$ appearing at the secondary winding 16 side in FIG. 6A:

$$E_1 = 2 \cdot E_2 \quad (5)$$

Therefore, the voltage $E_{02}$ appearing at the load 17 in FIG. 6B is expressed, when compared with the voltage $E_{01}$ appearing at the load 17 in FIG. 6A, as follows:

$$E_{01} = 2 \cdot E_{02} \quad (6)$$

Therefore, the voltage at the base of the transistor Q2 is also stepped down and the transistor Q2 inevitably enters an OFF state under such circumstances.

In this case, the current flows to the center tap 3 and the line 140 provided in the secondary winding 16 side of the power transformer 2 through the diode D5, and hence the common potential of the anode of the diode D5 must be higher than the potential at the junction 103. Therefore, the potential at the junction 103 is changed as shown by arrows 22 and 23 in a line 21 in FIG. 8 to be lower than the common potential by the saturation voltage of 0.6 V of the diode D5. Thus, the potential at the junction 102 is −0.6 V, so that the Zener diode ZD1 is made conductive and a low voltage is applied to the base of the transistor Q2 thereby to retain the transistor Q2 in an ON state.

The voltage $E_0$ appearing at the load 17 in FIG. 5 is thus changed as shown by arrows 200, 201 and 202 in FIG. 7.

Then the input voltage in the primary winding side of the power transformer 2 is gradually stepped down, e.g., from around 260 V.

TABLE 2

| | VOLTAGE HIGH → $E_{01}$ → $E_{02}$ → LOW | | | |
|---|---|---|---|---|
| ZD1 | ON | ON | OFF | |
| ZD2 | ON | OFF | OFF | |
| Q1 | OFF | OFF | ON | |
| Q2 | ON | ON | OFF | |
| SCR | OFF | OFF | ON | |

At this time, the transistor Q2 is in an ON state while the transistor Q1 and the thyristor SCR are in OFF states. The Zener diodes ZD1 and ZD2 are in ON states. Therefore, the power circuit 100 in FIG. 5 is equivalent to the circuit as shown in FIG. 6B.

When the voltage $E_0$ at the load 17 is lower than the Zener diode ZD2, i.e., when $E_0 \leq E_{02}$ in FIG. 7, the Zener diode ZD1 enters an OFF state. Therefore, the transistor Q2 enters an OFF state, whereby the circuit for short-circuiting the base of the transistor Q1 and the line 128 through the transistor Q2 is cut off. The base voltage of the transistor Q2 is stepped down so that the transistor Q1 enters an ON state, whereby the current flows to the gate side of the thyristor SCR, which in turn enters an ON state.

As a result a circuit for grounding the junction 99 of the full-wave rectifier circuit 8 at the common potential through the thyristor SCR is formed. The current flows between both ends of the secondary winding 16 of the power transformer 2 at this time, and hence the voltage $E_0$ at the load 17 is as follows:

$$E_0 = 2 \cdot E_{02} \quad (7)$$

With respect to the voltage $E_3$ at the secondary winding 16 side of the power transformer 2, the voltage at the center tap 3 is changed as shown by arrows 24 and 25 in the line 21 in FIG. 8, to be $E_3/2$, i.e., at positive potential, and hence no current flows between the diode D5 and the center tap 3. Therefore, the power circuit 100 is equivalent to the circuit shown in FIG. 6B at this time, whereby a single-voltage current is continuously outputted.

In such a manner as hereinabove described, the output from the full-wave rectifier circuit 8 is discriminated by comparison with the predetermined value set by the Zener diodes ZD1 and ZD2. In response to the outputs from the Zener diodes ZD1 and ZD2, the transistors Q1 and Q2 and the thyristor SCR enter ON/OFF states respectively. Consequently, the output from the full-wave rectifier circuit 8 can be automatically switched between the single voltage and the double voltage in response to the input voltage level.

Since no mechanical switching means is required in such a power circuit 100, the circuit is prevented from errors in operation caused by mechanical damage or the like in the switching means. Further, such a power circuit 100 requires no large-sized transformer, whereby the product to which the power circuit 100 is applied, e.g., a television receiver can be miniaturized to be lightweight in structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power transfer circuit comprising:
    a power transformer provided with a secondary winding having a center tap;
    full-wave rectifier means having input terminals connected to both ends of said secondary winding of said power transformer for rectifying an AC voltage generated at both ends of said secondary winding and outputting a DC voltage at one output terminal thereof; and
    switching control means respectively connected between said center tap of said secondary winding of said power transformer and ground and between another output terminal of said full-wave rectifier means and ground, for selectively grounding either said center tap or said another output terminal of said full-wave rectifier means in response to the amplitude of said DC voltage outputted at said one output terminal.

2. A power transfer circuit as claimed in claim 1, wherein
    said switching control means includes:
    level discriminator means for making a level discrimination as to whether or not said DC voltage outputted at said one output terminal of said full-wave rectifier means exceeds a predetermined level;

switching elements connected between said center tap of said secondary winding of said power transformer and ground and between the other output terminal of said full-wave rectifier means and ground; and switch control means for controlling said switching elements so as to ground said other output terminal of said full-wave rectifier means in response to said level discriminator means sensing that said DC voltage outputted from said one output terminal of said full-wave rectifier means is less than said predetermined level, and to ground said center tap in response to said level discriminator means sensing that said DC voltage outputted from said one output terminal of said full-wave rectifier means exceeds said predetermined level.

3. A power transformer circuit as claimed in claim 2, wherein said level discriminator means includes:
a first Zener diode having a cathode connected to said one output terminal of said full-wave rectifier means and an anode connected to ground; and
a second Zener diode having a cathode connected to said one output terminal of said full-wave rectifier means and an anode connected to said center tap of said secondary winding of said power transformer.

4. A power transfer circuit as claimed in claim 2, wherein said switching elements include:
a diode connected between said center tap of said secondary winding of said power transformer and ground; and
a thyristor having a control electrode connected to an output of said switch control means, a cathode connected to said other output terminal of said full-wave rectifier circuit and an anode connected to ground.

5. A power transfer circuit as claimed in claim 2, wherein said switch control means include:
a first transistor having an emitter connected to said one output terminal of said full-wave rectifier means and a base connected to a level discrimination output of said level discriminator means; and
a second transistor having an emitter connected to said one output terminal of said full-wave rectifier means, a base connected to the collector of said first transistor, and a collector connected to said switching element connected between said center tap and ground.

* * * * *